(12) United States Patent
Mei et al.

(10) Patent No.: US 11,304,560 B2
(45) Date of Patent: Apr. 19, 2022

(54) COOKING APPLIANCE

(71) Applicant: FOSHAN SHUNDE MIDEA ELECTRICAL HEATING APPLIANCES MANUFACTURING CO., LIMITED, Foshan (CN)

(72) Inventors: Ruoyu Mei, Foshan (CN); Weijie Chen, Foshan (CN); Pofeng Ho, Foshan (CN); Dianguo Pan, Foshan (CN); Xiaokai Liu, Foshan (CN); Ya Zhou, Foshan (CN)

( * ) Notice: Subject to any disclaimer, the term of this patent is extended or adjusted under 35 U.S.C. 154(b) by 437 days.

(21) Appl. No.: 16/343,784

(22) PCT Filed: Aug. 23, 2017

(86) PCT No.: PCT/CN2017/098677
§ 371 (c)(1),
(2) Date: Apr. 22, 2019

(87) PCT Pub. No.: WO2018/072552
PCT Pub. Date: Apr. 26, 2018

(65) Prior Publication Data
US 2019/0274474 A1   Sep. 12, 2019

(30) Foreign Application Priority Data
Oct. 20, 2016 (CN) .......................... 201610916064.5

(51) Int. Cl.
*A47J 36/32* (2006.01)
*A47J 43/24* (2006.01)
*A47J 36/00* (2006.01)

(52) U.S. Cl.
CPC ............... *A47J 36/32* (2013.01); *A47J 36/00* (2013.01); *A47J 43/24* (2013.01)

(58) Field of Classification Search
CPC .. A47J 27/04; A47J 36/00; A47J 36/32; A47J 43/24
See application file for complete search history.

(56) References Cited

FOREIGN PATENT DOCUMENTS

| CN | 203138137 A | 8/2013 |
|----|-------------|--------|
| CN | 203138137 U | 8/2013 |

(Continued)

OTHER PUBLICATIONS

International Search Report dated Oct. 30, 2017 in the corresponding PCT application (application No. PCT/CN2017/098677).

(Continued)

*Primary Examiner* — Dana Ross
*Assistant Examiner* — Joseph W Iskra
(74) *Attorney, Agent, or Firm* — Kilpatrick Townsend & Stockton, LLP

(57) ABSTRACT

The present disclosure provides a cooking appliance, comprising: a cooking system and a transport control system, wherein the cooking system comprises a cleaning device and a cooking cavity connected with the cleaning device; the cleaning device is provided with a first input port and a second input port; the transport control system comprises a material transport pipe, a water transport pipe and a drying device; the material transport pipe communicates with the first input port for transporting a foodstuff to be cleaned to the cleaning device; the water transport pipe communicates with the second input port for transporting water for cleaning the foodstuff to the cleaning device; and the drying device is connected with the material transport pipe for drying an inner wall surface of the material transport pipe.

13 Claims, 3 Drawing Sheets

(56) References Cited

FOREIGN PATENT DOCUMENTS

| | | | |
|---|---|---|---|
| CN | 204931266 | * | 1/2016 |
| CN | 204931266 U | | 1/2016 |
| CN | 105395033 A | | 3/2016 |
| CN | 205125903 U | | 4/2016 |
| CN | 105747942 A | | 7/2016 |
| CN | 206252299 U | | 6/2017 |
| JP | H05184455 A | | 7/1993 |
| JP | 2002224578 A | | 8/2002 |
| JP | 2002282716 A | | 10/2002 |
| JP | 2004065533 | * | 3/2004 |
| JP | 2004065533 A | | 3/2004 |
| JP | 2010505583 A | | 2/2010 |

OTHER PUBLICATIONS

The first OA corresponding to JP Application No. 2019-520963.

* cited by examiner

COOKING APPLIANCE

PRIORITY CLAIM AND RELATED APPLICATION

The present disclosure is a national phase application of International Application No. PCT/CN2017/098677, filed Aug. 23, 2017, which claims the priority of Chinese Application No. 201610916064.5, filed in the Chinese Patent Office on Oct. 20, 2016, and entitled "COOKING APPLIANCE", the entire contents of which are herein incorporated by reference.

FIELD

The present disclosure relates to the field of kitchen appliances, in particular to a cooking appliance.

BACKGROUND

At present, with respect to intelligent cooking appliance such as automatic rice cookers and the like, fine particles, such as starch and the like, on foodstuffs such as rice and the like are attached to and deposited on material transport pipes during material transport, thus affecting the cleanliness of the pipes, and affecting the material transport efficiency of the product over time.

SUMMARY

Embodiments of the present disclosure provide a cooking appliance.

In view of this, the present disclosure provides a cooking appliance, comprising: a cooking system, comprising a cleaning device and a cooking cavity connected to the cleaning device, wherein the cleaning device is provided with a first input port and a second input port; and a transport control system, comprising a material transport pipe, a water transport pipe and a drying device, wherein the material transport pipe communicates with the first input port for transporting a foodstuff to be cleaned to the cleaning device, the water transport pipe communicates with the second input port for transporting water for cleaning the foodstuff to the cleaning device, and the drying device is connected with the material transport pipe for drying an inner wall surface of the material transport pipe.

The cooking appliance provided by the present disclosure is provided with the driving device to dry the inner wall surface of the material transport pipe, so that the inner wall surface of the material transport pipe may be kept dry, thereby avoiding the attachment and the deposition of particles, such as starch, on the surface of the foodstuff, such as rice, and ensuring the cleanness and smoothness of the material transport pipe, and then the long-term and efficient use of the material transport pipe is guaranteed.

Specifically, the cooking appliance comprises the cooking system and the transport control system. The cooking system is used for cleaning the foodstuff and cooking the foodstuff, and the transport control system is used for transporting the foodstuff to be cleaned, such as rice, and the water for cleaning the foodstuff into the cleaning device, so that the cooking system cooperates with the transport control system to achieve automatic material transport and automatic cleaning and ensure a fully-automatic function of the product. The transport control system respectively transports the foodstuff to be cleaned and the water for cleaning the foodstuff to the cleaning device through the material transport pipe and the water transport pipe, that is, the foodstuff and the water are separately transported, thereby facilitating the quantitative transport of the foodstuff and the quantitative transport of the water, and thus the automatic function of the cooking appliance is further improved. Furthermore, the transport control system further comprises the drying device, and the drying device is connected with the material transport pipe to dry the inner wall surface of the material transport pipe, so that the inner wall surface of the material transport pipe is permanently kept dry. Therefore, compared with the prior art, the attachment and the deposition of particles, such as starch, on the inner wall surface of the material transport pipe are avoided while the full automation of the product is achieved, thereby ensuring the cleanness and smoothness of the material transport pipe, and then the long-term and efficient performance of the product is guaranteed.

In one embodiment, the drying device comprises: an air supply component, wherein an air supply outlet of the air supply component communicates with an inlet of the material transport pipe for supplying air into the material transport pipe; and a heating component, arranged between the air supply component and the inlet of the material transport pipe for heating the air supplied by the air supply component to dry the inner wall surface of the material transport pipe.

The drying device comprises the air supply component and the heating component. The air supply component is capable of supplying air into the material transport pipe to accelerate the flow rate of the air and to promote the evaporation of moisture. The heating component is capable of heating the air supplied by the air supply component to further improve the evaporation speed of the moisture, thereby effectively ensuring the dryness of the inner wall surface of the material transport pipe. In addition, the air supply component is also capable of accelerating the material transport and achieving air agitation in the cleaning device. Specifically, before the material transport, the air supply component and the heating component are simultaneously operated to dry the inner wall surface of the material transport pipe, and then a material transport action is started, so that the attachment and the deposition of particles, such as starch, on the foodstuff may be effectively avoided; furthermore, the air supply component still keeps open during the material transport, so that the foodstuff may quickly enter the cleaning device, and the particles, such as starch, falling from the foodstuff are also blown into the cleaning device under the action of the air, without staying in the material transport pipe; and after the material transport is completed, the air supply component still keeps open, then the air supply component is capable of continuously supplying the air into the cleaning device to promote the movement of the foodstuff and the water and to stir the two substances, thereby realizing the air agitation of the foodstuff and cleaning the foodstuff more efficiently.

It may be understood that, the air supply component may be separately provided, the air supplied by the air supply component is used for drying the inner wall surface of the material transport pipe, and then the inner wall surface of the material transport pipe may keep dry; or, the heating component is separately provided, as long as the heating range of the heating component may cover the entire material transport pipe, the inner wall surface of the material transport pipe may also be dried, and the inner wall surface of the material transport pipe may also keep dry.

In one embodiment, the heating component is arranged at the air supply outlet of the air supply component.

Since the heating component is arranged at the air supply outlet of the air supply component, the air supplied by the air supply component may be effectively heated to quickly and uniformly dry the inner wall surface of the material transport pipe via the hot air.

In one embodiment, the air supply component is a cyclone motor.

In one embodiment, the heating component is a resistance heating element.

Since the air supply component is the cyclone motor, the wind power is high and the use reliability is strong, and of course, other air supply components may also be used, which are not listed one by one herein; and since the heating component is the resistance heating element, the heat efficiency is high and the cost is low, and of course, other heating components may also be used, which are not listed one by one herein.

In one embodiment, the transport control system comprises: a material transport device comprising a material transport component, the material transport pipe and the drying device, wherein the material transport component communicates with the inlet of the material transport pipe for transporting the foodstuff to be cleaned into the material transport pipe; a waterway transport device comprising a water transport component and the water transport pipe, wherein the water transport component communicates with the inlet of the water transport pipe for transporting the water for cleaning the foodstuff into the water transport pipe; and a control device connected with the material transport device and the waterway transport device for controlling the connection and disconnection of the material transport device and the waterway transport device.

The transport control system comprises the material transport device, the waterway transport device and the control device, the material transport device communicates with the first input port for transporting the foodstuff to be cleaned to the cleaning device through the wind power or other power so as to realize a material transport function of the transport control system; the waterway transport device communicates with the second input port for transporting the water for cleaning the foodstuff to the cleaning device so as to realize a water transport function of the transport control system; the control device is connected with the material transport device and the waterway transport device for respectively controlling the start and stop of the material transport action and the start and stop of the water transport action by controlling the connection and disconnection of the two components, so as to realize a control function of the transport control system; and the material transport device, the waterway transport device and the control device cooperate with each other to realize automatic material transport and automatic water transport of the cooking appliance, and ensure that the cooking appliance is capable of automatically cleaning the foodstuff to realize a full-automatic function of the cooking appliance.

In one embodiment, the material transport component comprises: a storage bin for storing the foodstuff, wherein the storage bin is provided with a discharge port; a discharge pipe, wherein the inlet of the discharge pipe communicates with the discharge port, and an outlet of the discharge pipe communicates with the inlet of the material transport pipe; and a first control component arranged on the discharge pipe and connected with the control device for controlling the connection and disconnection of the discharge pipe.

The material transport component comprises the storage bin, the discharge pipe and the first control component. During the material transport, the control device controls the first control component to connect the discharge pipe, and the foodstuff in the storage bin enters the material transport pipe through the discharge pipe and enters the cleaning device through the first input port under the blowing of the air supply component, so that the material transport function of the material transport device is achieved. After the material transport is completed, the control device controls the first control component to disconnect the discharge pipe, then the material transport device stops material transport, but the air supply component may still supply air into the material transport pipe, so that the air enters the cleaning device to promote the movement of the foodstuff and the water and to stir the two substances, thereby being able to realize the air agitation of the foodstuff and to clean the foodstuff more efficiently.

Of course, In one embodiment, the material transport is realized by the wind power of the air supply component, that is, pneumatic material transport, so that the material transport is high in efficiency, clean and pollution-free; and furthermore, the air agitation of the foodstuff may also be realized to clean the foodstuff more efficiently.

In one embodiment, the material transport component further comprises: a sensor weighing device connected with the storage bin and capable of weighing the total weight of the storage bin and the foodstuff in the storage bin.

By arranging the sensor weighing device to weigh the total weight of the storage bin and the foodstuff in the storage bin, the weight of the foodstuff out from the storage bin, that is, the weight of the foodstuff transported to the cleaning device, may be obtained by a weight change displayed by the sensor weighing device, and then accurate and quantitative material transport of the material transport device is realized.

In one embodiment, the storage bin is funnel-shaped.

In one embodiment, the material transport pipe is a hose.

In one embodiment, the first control component is an electromagnetic ball valve.

Since the storage bin is funnel-shaped, the foodstuff may be automatically discharged under the action of gravity, and of course, the shape of the storage bin is not limited to the funnel shape; the material transport pipe is the hose, the hose has good flexibility and relatively low requirements for the installation space, thereby realizing simple, effective and flexible material transport, making the space arrangement be more flexible and saving the space; and the first control component is the electromagnetic ball valve, which can realize reliable control and high in sensitivity, and of course, it may be other control components.

In one embodiment, the discharge pipe, the material transport pipe and the air supply component are connected by a transfer component, the transfer component comprises three ports, and the three ports respectively communicate with the outlet of the discharge pipe, the inlet of the material transport pipe and the air supply outlet of the air supply component.

The discharge pipe, the material transport pipe and the air supply component are connected by the transfer component having three ports, then the foodstuff in the discharge pipe first enters the transfer component, then is blown into the material transport pipe by the air supply component and enters the cleaning device through the material transport pipe. This layout is very reasonable, and ensures that the foodstuff may only flow toward the cleaning device instead of flowing on an opposite direction, thus ensuring the reliability of the product.

In one embodiment, the transfer component is a three-way pipe or a container comprising the three ports.

The transfer component is the three-way pipe, which is reliable to connect, low in price and convenient to install; the transfer component is the container comprising three ports, such as a container shaping like a three-necked flask, so that the transfer component also plays a certain transition role, in this way, the foodstuff may stay in the transfer component and generate tumbling and rubbing under the action of the wind power, so that some particles on the surface of the foodstuff fall off, thus playing a certain dry cleaning effect and improving the cleanliness of the food. Of course, the transfer component may also be other components as long as it has three ports and may realize the effective connection of the discharge pipe, the material transport pipe and the air supply component.

In one embodiment, the water transport component comprises: a water supply component communicating with the inlet of the water transport pipe for supplying water to the water transport pipe; and a second control component arranged on the water transport pipe and connected with the control device for controlling the connection and disconnection of the water transport pipe.

The water transport component comprises the water supply component and the second control component. During water transport, the control device controls the second control component to connect the water transport pipe, the water supply component conveys water into the cleaning device through the water transport pipe to realize a water transport function of the waterway transport device. After the water transport is completed, the control device controls the second control component to disconnect the water transport pipe, then the foodstuff and the water in the cleaning device are mixed with each other to clean the foodstuff; and after the cleaning device completes the cleaning action, the water transport pipe may be connected again to transport water to the cleaning device again, so that the cleaning device is cleaned effectively.

In one embodiment, the water transport component further comprises: a flowmeter arranged on the water transport pipe for detecting the water volume passing through the water transport pipe.

The flowmeter is arranged on the water transport pipe, the flow rate passing through the water transport pipe is detected by the flowmeter to obtain the water volume conveyed by the waterway transport device into the cleaning device, and then accurate and quantitative water transport is achieved.

In one embodiment, the water transport pipe is a hose.

In one embodiment, the second control component is an electromagnetic valve.

In one embodiment, the water supply component comprises a water pipe joint or a water tank, the water pipe joint may be connected with an external water source to transport external water into the water transport pipe, and the water tank is capable of storing the water for cleaning the foodstuff.

The water transport pipe is the hose, the hose has good flexibility, and is easy to deform and low in requirements for the installation space, so that simple, effective and flexible water transport is achieved, the space arrangement is more flexible, and the space is saved; and the second control component is the electromagnetic valve, the control is reliable, the sensitivity is high, and of course, the second control component may also be other control components.

The water supply component comprises the water pipe joint, the water in the external water source is directly transported by the water pipe joint to the cleaning device, for example, directly connected with a tap water pipeline, thereby being very convenient, and no single water storage structure needs to be arranged, so that the structure of the cooking appliance is simplified, the overall structure is more compact, and less space is occupied. Further, a third control component is arranged on the water pipe joint to control the connection and disconnection of the water pipe joint, and the water backflow in the water transport pipe may be avoided, thereby further improving the use reliability of the product.

The water supply component comprises the water tank, and the water may be conveniently supplied to the cleaning device by the water storage of the water tank. Further, by arranging a water pump, it is ensured that the water in the water tank may be pumped into the cleaning device, thereby ensuring the use reliability of the product.

In one embodiment, the transport control system is arranged on one side of the cooking system, such that the cooking appliance has a horizontal structure.

The transport control system is arranged on one side of the cooking system, such that the cooking appliance has the horizontal structure, in this way, the vertical structure in the prior art is avoided, the structure and control principle of the product are simplified on the basis of ensuring full automation of the product, the overall structure is compact, and the occupied space is reduced. In one embodiment, the transport control system is arranged on the left side or the right side of the cooking system; and in another embodiment, the transport control system is arranged on the front side or the rear side of the cooking system.

In one embodiment, the cooking appliance is a rice cooker.

Of course, the cooking appliance is not limited to the rice cooker, and may also be an electric pressure cooker or other cooking appliances.

Additional aspects and advantages of the present disclosure will become apparent in the following description, or are understood by the practice of the present disclosure.

BRIEF DESCRIPTION OF DRAWINGS

The above and/or additional aspects and advantages of the present disclosure will become apparent and readily understood from the following descriptions of embodiments in combination with the drawings.

Figure 1:
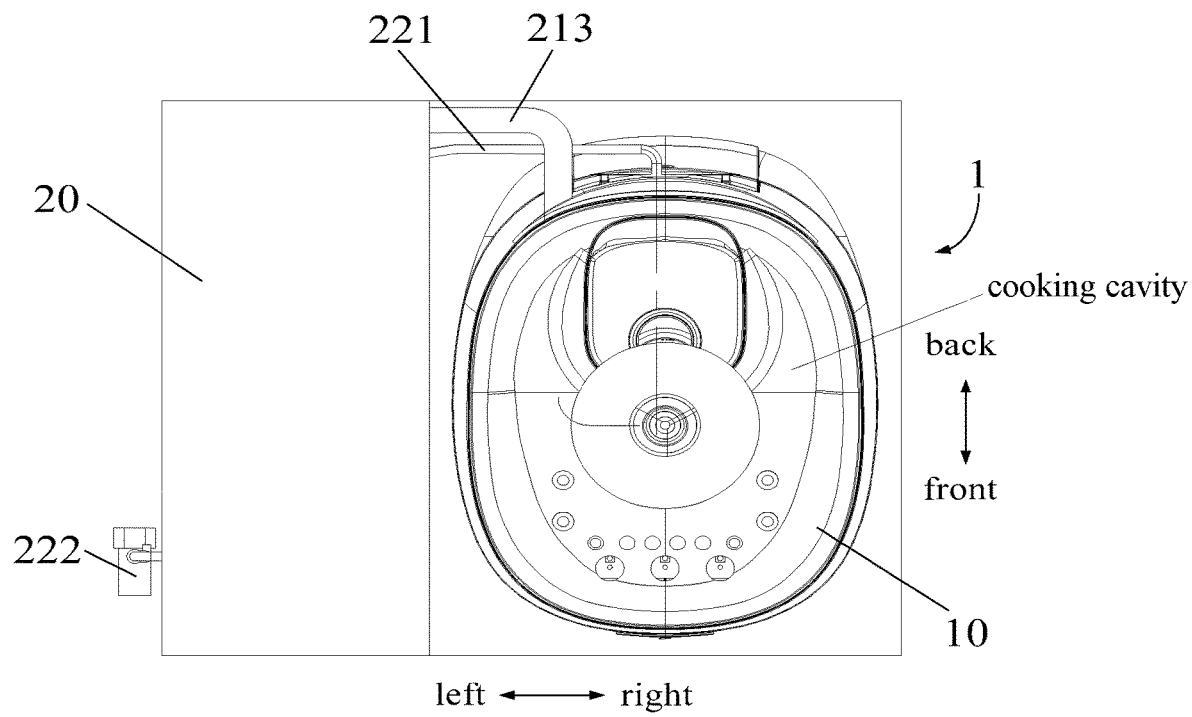
FIG. 1 is a schematic diagram of an overlooking structure of a cooking appliance in some embodiments of the present disclosure.
Figure 2:
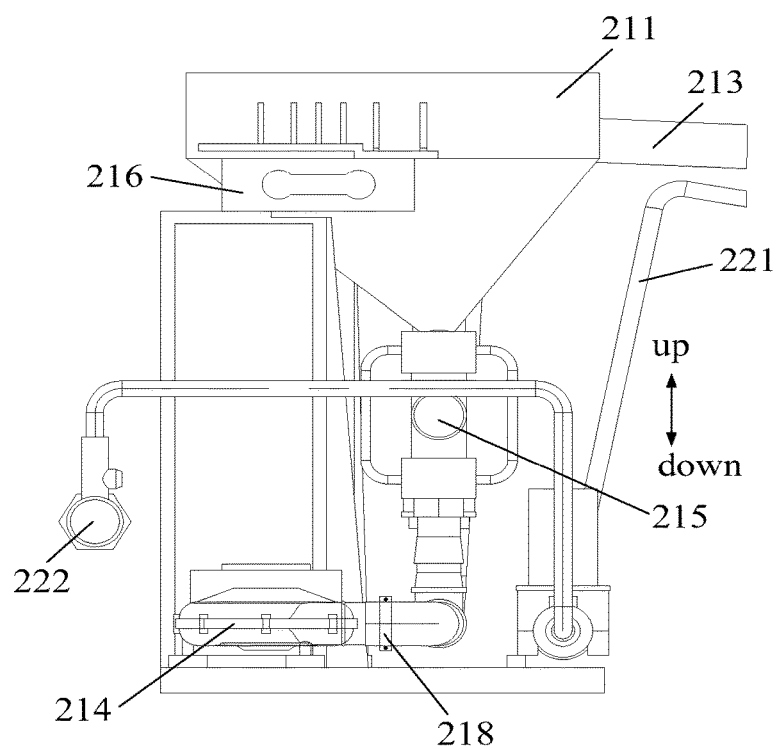
FIG. 2 is a structural schematic diagram of a transport control system in FIG. 1.
Figure 3:
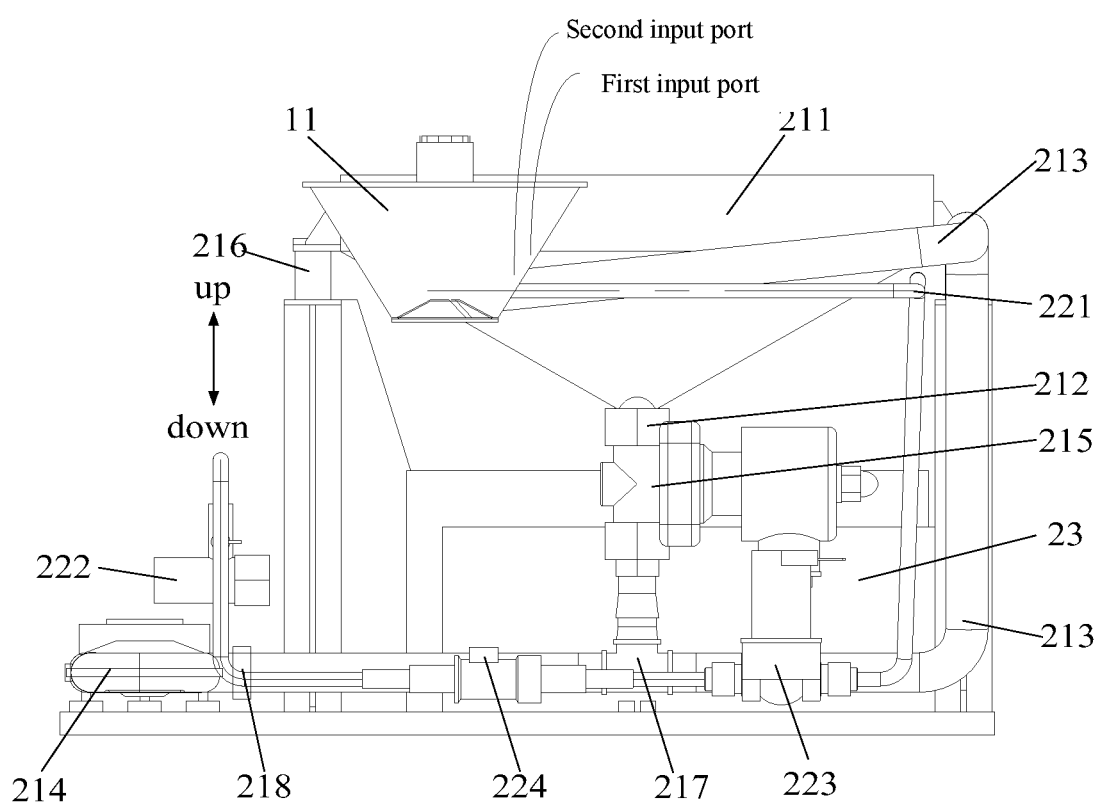
FIG. 3 is a schematic diagram of a right view of the structure (comprising a cleaning device) as shown in FIG. 2.
Figure 4:
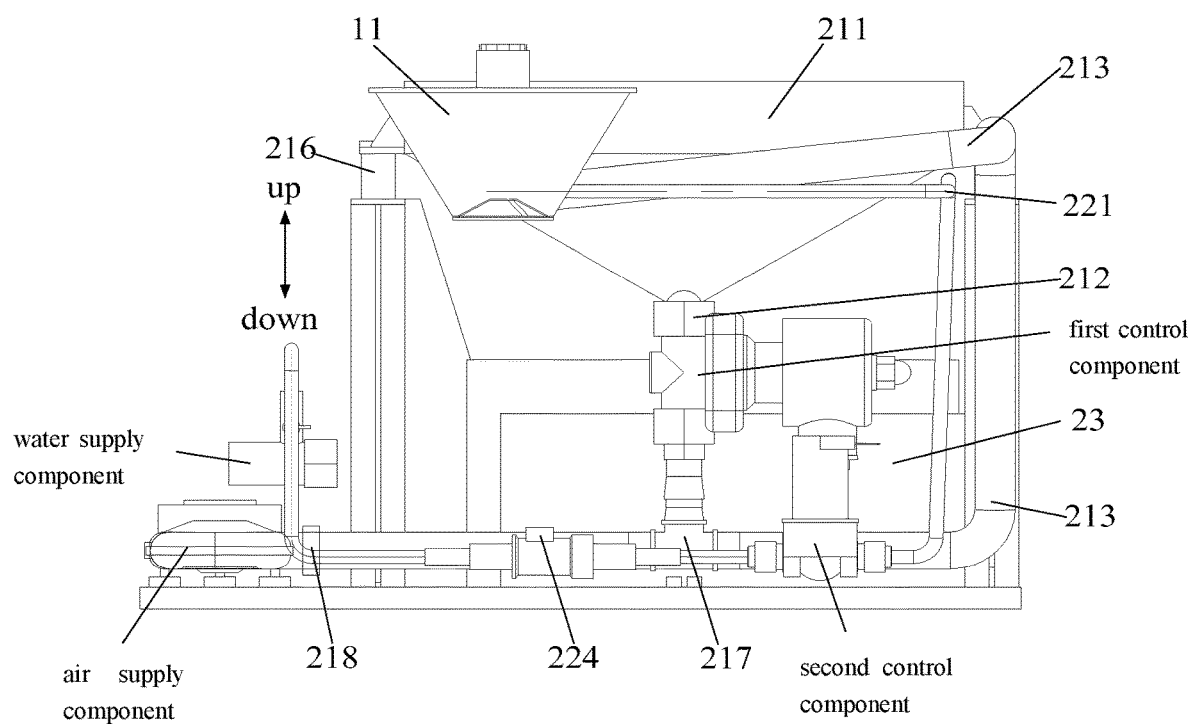
FIG. 4 is a schematic diagram of a right view of the structure (comprising a cleaning device) as shown in FIG. 2.

The corresponding relationship between reference signs and component names in FIG. 1 to FIG. 3 is as follows:

1 rice cooker, 10 cooking system, 11 cleaning device, 20 transport control system, 211 storage bin, 212 discharge pipe, 213 material transport pipe, 214 cyclone motor, 215 electromagnetic ball valve, 216 sensor weighing device, 217 three-way pipe, 218 heating component, 221 water transport pipe, 222 water pipe joint, 223 electromagnetic valve, 224 flowmeter, 23 control device.

DETAILED DESCRIPTION OF EMBODIMENTS

Embodiments of the present disclosure will be further described in detail below in combination with drawings. It should be noted that the embodiments of the present application and the features in the embodiments may be combined with each other without conflicts.

In the following description, numerous specific details are set forth in order to provide a full understanding of the present disclosure, but the present disclosure may be practiced otherwise than as described herein. Therefore, the protection scope of the present disclosure is not limited by specific embodiments disclosed below.

The cooking appliance according to some embodiments of the present disclosure are described below with reference to FIG. 1 to FIG. 3.

As shown in FIG. 1 to FIG. 3, the cooking appliance provided by the present disclosure comprises: a cooking system 10 and a transport control system 20.

Specifically, as shown in FIG. 3, the cooking system 10 comprises a cleaning device 11 and a cooking cavity connected with the cleaning device 11, wherein the cleaning device 11 is provided with a first input port and a second input port; and the transport control system 20 comprises a material transport pipe 213, a water transport pipe 221 and a drying device, wherein the material transport pipe 213 communicates with the first input port for transporting a foodstuff to be cleaned to the cleaning device 11, the water transport pipe 221 communicates with the second input port for transporting water for cleaning the foodstuff to the cleaning device 11, and the drying device is connected with the material transport pipe 213 for drying an inner wall surface of the material transport pipe 213.

The cooking appliance provided by the present disclosure is provided with the driving device to dry the inner wall surface of the material transport pipe 213, so that the inner wall surface of the material transport pipe 213 may be kept dry, thereby avoiding the attachment and the deposition of particles, such as starch, on the surface of the foodstuff, such as rice, and ensuring the cleanness and smoothness of the material transport pipe 213, and then the long-term and efficient use of the material transport pipe 213 is guaranteed.

Specifically, the cooking appliance comprises the cooking system 10 and the transport control system 20. The cooking system 10 is used for cleaning the foodstuff and cooking the foodstuff, and the transport control system 20 is used for transporting the foodstuff to be cleaned, such as rice, and the water for cleaning the foodstuff into the cleaning device 11, so that the cooking system 10 cooperates with the transport control system 20 to achieve automatic material transport and automatic cleaning and ensure a fully-automatic function of the product. The transport control system 20 respectively transports the foodstuff to be cleaned and the water for cleaning the foodstuff to the cleaning device 11 through the material transport pipe 213 and the water transport pipe 221, that is, the foodstuff and the water are separately transported, thereby facilitating the quantitative transport of the foodstuff and the quantitative transport of the water, and thus the automatic function of the cooking appliance is further improved. Furthermore, the transport control system 20 further comprises the drying device, the drying device is connected with the material transport pipe 213 to dry the inner wall surface of the material transport pipe 213, so that the inner wall surface of the material transport pipe 213 is permanently kept dry. Therefore, compared with the prior art, the attachment and the deposition of particles, such as starch, on the inner wall surface of the material transport pipe 213 are avoided while the full automation of the product is achieved, thereby ensuring the cleanness and smoothness of the material transport pipe 213, and then the long-term and efficient performance of the product is guaranteed.

The cooking appliance provided by the present disclosure is described below in detail in combination with some specific embodiments.

Embodiment 1

As shown in FIG. 1, the cooking appliance is a rice cooker 1.

Specifically, as shown in FIG. 2 and FIG. 3, the transport control system 20 comprises: a material transport device, a waterway transport device and a control device 23. The material transport device comprises a material transport component, the material transport pipe 213 and the drying device, wherein the material transport component communicates with the inlet of the material transport pipe 213 for transporting the foodstuff to be cleaned into the material transport pipe 213; the waterway transport device comprises a water transport component and the water transport pipe 221, wherein the water transport component communicates with the inlet of the water transport pipe 221 for transporting the water for cleaning the foodstuff into the water transport pipe 221; and the control device 23 is connected with the material transport device and the waterway transport device for controlling the connection and disconnection of the material transport device and the waterway transport device.

More specifically, as shown in FIG. 2 and FIG. 3, the material transport component comprises: a storage bin 211, a discharge pipe 212 and a first control component. The storage bin 211 is used for storing the foodstuff, and the storage bin 211 is provided with a discharge port; the inlet of the discharge pipe 212 communicates with the discharge port, and an outlet of the discharge pipe 212 communicates with the inlet of the material transport pipe 213; and the first control component is arranged on the discharge pipe 212 and is connected with the control device 23 for controlling the connection and disconnection of the discharge pipe 212.

As shown in FIG. 2 and FIG. 3, the water transport component comprises: a water supply component and a second control component. The water supply component communicates with the inlet of the water transport pipe 221 for supplying water to the water transport pipe 221; and the second control component is arranged on the water transport pipe 221 and is connected with the control device 23 for controlling the connection and disconnection of the water transport pipe 221. The water supply component comprises a water pipe joint 222, and the water pipe joint 222 receives household tap water.

Further, as shown in FIG. 2 and FIG. 3, the material transport component further comprises: a sensor weighing device 216 connected with the storage bin 211 and capable of weighing the total weight of the storage bin 211 and the foodstuff in the storage bin 211. The water transport component further comprises: a flowmeter 224 arranged on the water transport pipe 221 for detecting the water volume passing through the water transport pipe 221.

In one embodiment, as shown in FIG. 2 and FIG. 3, the storage bin 211 is funnel-shaped, both of the material transport pipe 213 and the water transport pipe 221 are hoses, the first control component is an electromagnetic ball valve 215, and the second control component is a electromagnetic valve 223.

As shown in FIG. 2 and FIG. 3, the drying device comprises: an air supply component and a heating component 218. Specifically, an air supply outlet of the air supply component communicates with the inlet of the material transport pipe 213 for supplying air into the material transport pipe 213; the heating component 218 is arranged between the air supply component and the inlet of the material transport pipe 213 for heating the air supplied by the air supply component to dry the inner wall surface of the material transport pipe 213; and the discharge pipe 212, the material transport pipe 213 and the air supply component are connected by a three-way pipe 217.

In one embodiment, as shown in FIG. 2 and FIG. 3, the heating component 218 is arranged at the air supply outlet of the air supply component.

In one embodiment, as shown in FIG. 2 and FIG. 3, the air supply component is a cyclone motor 214, and the heating component 218 is a resistance heating element.

The working principle of the cooking appliance is as follows: before the material transport, the resistance heating element and the cyclone motor 214 are simultaneously operated to dry the material transport pipe 213; during the transporting material, the electromagnetic ball valve 215 is opened, meanwhile the cyclone motor 214 operates, a waterway electromagnetic valve 223 is in a closed state at this time, then the rice or other foodstuffs in the funnel are transported into the cleaning device 11 of the cooking system 10, and quantitative material transport is achieved in combination with the sensor weighing device 216; after the material transport action is completed, the electromagnetic ball valve 215 is closed and the cyclone motor 214 is turned on; and the waterway electromagnetic valve 223 is opened to transport water into the cleaning device 11 of the cooking system 10, the flowmeter 224 simultaneously measures the water volume, and when the water volume reaches a limited volume of a container, the waterway electromagnetic valve 223 is closed to achieve quantitative water supply. When the cleaning device 11 performs the cleaning action, the cyclone motor 214 may be turned on, so that the cyclone motor 214 continuously blows air into the cleaning device 11 to accelerate the movement of the foodstuff and the water in the cleaning device 11 to achieve air agitation. When the cleaning device 11 completes the cleaning action, and after the cleaned foodstuff is removed, the waterway electromagnetic valve 223 is opened again to clean the cleaning device 11 to keep the cleaning device 11 clean.

Therefore, the present embodiment realizes automatic cleaning and material transport by combining pneumatic material transport with waterway control, and ensures a compact overall structure and reduces the occupied space while realizing the full automation. Specifically, two functions are realized by the material transport device: simple, effective and flexible material transport, which makes the space arrangement be more flexible and saves the space; and the air agitation when the foodstuff, such as the rick, is cleaned, to effectively clean the foodstuff. By means of the cooperative action of the flowmeter 224 and the electromagnetic valve 223, two functions are also realized: precise control of the water volume and cleaning of the cleaning device 11. By means of the cooperative action of the weighing sensor device and the electromagnetic ball valve 215, the quantitative and accurate control of the rice is realized; and the cleaning device realizes a cleaning function through the pneumatic material transport and the water volume control.

The drying device comprises the air supply component and the heating component 218, and the air supply component is capable of supplying air into the material transport pipe 213 to accelerate the flow rate of the air and to promote the evaporation of moisture; the heating component 218 is capable of heating the air supplied by the air supply component to further improve the evaporation speed of the moisture, thereby effectively ensuring the dryness of the inner wall surface of the material transport pipe 213; and in addition, the air supply component is also capable of accelerating the material transport and achieving air agitation in the cleaning device 11. Since the heating component 218 is arranged at the air supply outlet of the air supply component, the air supplied by the air supply component may be effectively heated to quickly and uniformly dry the inner wall surface of the material transport pipe 213 via the hot air.

Since the air supply component is the cyclone motor 214, the wind power is strong and the use reliability is high, and of course, other air supply components may also be used, which are not listed one by one herein; and since the heating component 218 is the resistance heating element, the heat efficiency is high and the cost is low, and of course, other heating components 218 may also be used, which are not listed one by one herein.

Since the storage bin 211 is funnel-shaped, the foodstuff may be automatically discharged under the action of gravity, and of course, the shape of the storage bin 211 is not limited to the funnel shape; the material transport pipe 213 is the hose, the hose has good flexibility and relatively low requirements for the installation space, thereby realizing simple, effective and flexible material transport, making the space arrangement be more flexible and saving the space; and the first control component is the electromagnetic ball valve 215, which can realize reliable control and is high in sensitivity, and of course, it may be other control components.

The discharge pipe 212, the material transport pipe 213 and the air supply component are connected by a transfer component having three ports, then the foodstuff in the discharge pipe 212 first enters the transfer component, then is blown into the material transport pipe 213 by the air supply component and enters the cleaning device 11 through the material transport pipe 213, such a layout is very reasonable, and ensures that the foodstuff may only flow toward the cleaning device 11 instead of flowing toward an opposite direction, thus ensuring the use reliability of the product.

The water transport pipe 221 is the hose, the hose has good flexibility, and is easy to deform and low in requirements for the installation space, so that simple, effective and flexible water transport is achieved, the space arrangement is more flexible, and the space is saved; and the second control component is the electromagnetic valve 223, the control is reliable, the sensitivity is high, and of course, the second control component may also be other control components.

The discharge pipe 212, the material transport pipe 213 and the air supply component are connected by the three-way pipe 217, and the three-way pipe 217 is reliable to connect, low in price and convenient to install. Of course, the connection may also be achieved by other transfer components having three ports.

The water supply component comprises the water pipe joint 222, the water in the external water source is directly transported by the water pipe joint 222 to the cleaning device 11, for example, directly connected with a tap water pipeline, thereby being very convenient, and no single water storage structure needs to be arranged, so that the structure of the cooking appliance is simplified, the overall structure is more compact, and less space is occupied. Further, a third control component is arranged on the water pipe joint 222 to control the connection and disconnection of the water pipe joint 222, and the water backflow in the water transport pipe 221 may be avoided, thereby further improving the use reliability of the product.

Of course, the water supply component may also comprise a water tank, and the water may be conveniently supplied to the cleaning device 11 by the water storage of the water tank. Further, by arranging a water pump, it is ensured that the water in the water tank may be pumped into the cleaning device 11, thereby ensuring the use reliability of the product.

Embodiment 2 (not Shown in the Figure)

The difference with the embodiment 1 lies in that: the driving device only comprises the heating component 218, and the heating range of the heating component 218 may cover the entire material transport pipe 213, so that the inner wall surface of the material transport pipe 213 may also be dried, and the inner wall surface of the material transport pipe 213 may also keep dry.

The basic working principle of the present embodiment is basically the same as that of embodiment 1, and thus is not repeated redundantly herein.

In one embodiment, only the air supply component may be provided, and the inner wall surface of the material transport pipe 213 is dried by the air supplied by the air supply component, so that the inner wall surface of the material transport pipe 213 may also keep dry.

Embodiment 3 (not Shown in the Figure)

The difference with embodiment 1 lies in that: the heating component 218 is arranged on the material transport pipe 213.

The basic working principle of the present embodiment is basically the same as that of embodiment 1, and thus is not repeated herein. The embodiments of the present disclosure may also be achieved by arranging the heating component 218 on the material transport pipe 213 without deviating from the design idea and purpose of the present disclosure.

Embodiment 4 (not Shown in the Figure)

The difference with the embodiment 1 lies in that: the heating component 218 is embedded in the air supply component.

The basic working principle of the present embodiment is basically the same as that of embodiment 1, and thus is not repeated herein. The embodiments of the present disclosure may also be achieved by embedding the heating component 218 in the air supply component without deviating from the design idea and purpose of the present disclosure.

In one embodiment, as shown in FIG. 1, the transport control system 20 is arranged on one side of the cooking system 10, such that the cooking appliance has a horizontal structure.

The transport control system 20 is arranged on one side of the cooking system 10, such that the cooking appliance has the horizontal structure on the whole, in this way, the vertical structure in the prior art is avoided, the structure and control principle of the product are simplified on the basis of ensuring full automation of the product, the overall structure is compact, and the occupied space is reduced. In one embodiment, the transport control system 20 is arranged on the left side or the right side of the cooking system 10, as shown in FIG. 1; and in another embodiment, the transport control system 20 is arranged on the front side or the rear side of the cooking system 10.

Of course, the cooking appliance is not limited to the rice cooker 1, may also be an electric pressure cooker or other cooking appliances, and may also be further promoted to soybean milk machines, food processing industry, chemical industry, petroleum smelting industry, animal husbandry, agricultural automatic spraying, pharmaceutical industry, and other fields.

In summary, the cooking appliance provided by the present disclosure is provided with the driving device to dry the inner wall surface of the material transport pipe, so that the inner wall surface of the material transport pipe may be kept dry, thereby avoiding the attachment and the deposition of particles, such as starch, on the surface of the foodstuff, such as rice, and ensuring the cleanness and smoothness of the material transport pipe, and then the long-term and efficient use of the material transport pipe is guaranteed. Specifically, the cooking appliance comprises the cooking system and the transport control system, the cooking system is used for cleaning the foodstuff and cooking the foodstuff, and the transport control system is used for transporting the foodstuff to be cleaned, such as rice, and the water for cleaning the foodstuff into the cleaning device, so that the cooking system cooperates with the transport control system to achieve automatic material transport and automatic cleaning and ensure the fully-automatic function of the product; the transport control system respectively transports the foodstuff to be cleaned and the water for cleaning the foodstuff to the cleaning device through the material transport pipe and the water transport pipe, that is, the foodstuff and the water are separately transported, thereby facilitating the quantitative transport of the foodstuff and the quantitative transport of the water, and thus the automatic function of the cooking appliance is further improved; and furthermore, the transport control system further comprises the drying device, and the drying device is connected with the material transport pipe to dry the inner wall surface of the material transport pipe, so that the inner wall surface of the material transport pipe is permanently kept dry, therefore, compared with the prior art, the attachment and the deposition of particles, such as starch, on the inner wall surface of the material transport pipe are avoided while the full automation of the product is achieved, thereby ensuring the cleanness and smoothness of the material transport pipe, and then the long-term and efficient use performance of the product is guaranteed.

In the present disclosure, the terms "first", "second", and "third" are used for the purpose of description only, and cannot be construed as indicating or implying the relative importance; the term "plurality" means two or more, unless otherwise explicitly defined. The terms "installation", "connected", "connection", "fixed" and the like should be understood broadly. For example, "connection" may be a fixed connection, and may also be detachable connection or an integral connection; and "connected" may be either directly connected or connected through an intermediary. In one embodiment, the specific meanings of the above terms in the present disclosure may be understood in accordance with specific conditions.

In the description of the present disclosure, it should be understood that the orientation or positional relationships indicated by the terms "upper", "lower", "left", "right", "front", "back" and the like based on the orientation or positional relationships shown in the drawings, are merely for the convenience of the description of the present disclosure rather than indicating or implying that the devices or units referred to may have specific orientations, are constructed and operated in the specific orientations, and thus cannot be construed as limitations to the present disclosure.

In the description of the present specification, the description of the terms "one embodiment", "some embodiments", "specific embodiments" and the like means that the specific features, structures, materials or characteristics described in combination with the embodiments or examples are comprised in at least one embodiment or example of the present embodiment. In the present specification, the schematic representation of the above terms does not necessarily refer to the same embodiment or example. Furthermore, the specific features, structures, materials or characteristics described may be combined in a suitable manner in any one or more embodiments or examples.

What is claimed is:

1. A cooking appliance, comprising:
a cooking system, comprising:
a cleaning device and a cooking cavity connected to the cleaning device, wherein the cleaning device is provided with a first input port and a second input port; and
a transport control system, comprising:
a material transport pipe, a water transport pipe and a drying device, the material transport pipe communicates with the first input port for transporting a foodstuff to be cleaned to the cleaning device, the water transport pipe communicates with the second input port for transporting water for cleaning the foodstuff to the cleaning device, and the drying device is connected to the material transport pipe for drying an inner wall surface of the material transport pipe;
wherein the drying device comprises:
an air supply component, wherein an air supply outlet of the air supply component communicates with an inlet of the material transport pipe for supplying air into the material transport pipe; and
a heating component, arranged between the air supply component and the inlet of the material transport pipe for heating the air supplied by the air supply component to dry the inner wall surface of the material transport pipe.

2. The cooking appliance according to claim 1, wherein, the heating component is arranged at the air supply outlet of the air supply component.

3. The cooking appliance according to claim 1, wherein, the air supply component is a cyclone motor; and/or
the heating component is a resistance heating element.

4. The cooking appliance according to claim 1, wherein the transport control system comprises:
a material transport device comprising a material transport component, the material transport pipe and the drying device, wherein the material transport component communicates with the inlet of the material transport pipe for transporting the foodstuff to be cleaned into the material transport pipe;
a waterway transport device comprising a water transport component and the water transport pipe, wherein the water transport component communicates with the inlet of the water transport pipe for transporting the water for cleaning the foodstuff into the water transport pipe; and
a control device connected with the material transport device and the waterway transport device for controlling the connection and disconnection of the material transport device and the waterway transport device.

5. The cooking appliance according to claim 4, wherein the material transport component comprises:
a storage bin for storing the foodstuff, wherein the storage bin is provided with a discharge port;
a discharge pipe, wherein the inlet of the discharge pipe communicates with the discharge port, and an outlet of the discharge pipe communicates with the inlet of the material transport pipe; and
a first control component arranged on the discharge pipe and connected with the control device for controlling the connection and disconnection of the discharge pipe.

6. The cooking appliance according to claim 5, wherein the material transport component further comprises:
a sensor weighing device connected with the storage bin and configured to weigh a total weight of the storage bin and the foodstuff in the storage bin.

7. The cooking appliance according to claim 5, wherein, the storage bin is funnel-shaped; and/or
the material transport pipe is a hose; and/or
the first control component is an electromagnetic ball valve.

8. The cooking appliance according to claim 4, wherein the water transport component comprises:
a water supply component communicating with the inlet of the water transport pipe for supplying water to the water transport pipe; and
a second control component arranged on the water transport pipe and connected with the control device for controlling the connection and disconnection of the water transport pipe.

9. The cooking appliance according to claim 8, wherein the water transport component further comprises:
a flowmeter arranged on the water transport pipe for detecting water volume passing through the water transport pipe.

10. The cooking appliance according to claim 8, wherein the water transport pipe is a hose; and/or
the second control component is an electromagnetic valve; and/or
the water supply component comprises a water pipe joint or a water tank, the water pipe joint is configured to be connected with an external water source to transport external water into the water transport pipe, and the water tank is configured to store the water for cleaning the foodstuff.

11. The cooking appliance according to claim 1, wherein, the cooking appliance is a rice cooker.

12. The cooking appliance according to claim 1, wherein the air supply component is configured to:
when the cleaning device performs cleaning action, the air supply component blows air into the cleaning device to accelerate movement of the foodstuff and the water in the cleaning device.

13. The cooking appliance according to claim 1, wherein the air supply component and the heating component are configured to:
before material transport, the air supply component and the heating component are simultaneously operated to dry the inner wall surface of the material transport pipe;
during the material transport, the air supply component keeps open to blow the foodstuff into the cleaning device; and
after the material transport is completed, the air supply component keeps open to supply the air into the cleaning device to promote movement of the foodstuff and the water.

* * * * *